3,275,594
STABILIZED POLYAMIDES CONTAINING (A) A COPPER COMPOUND AND (B) A NITROGEN CONTAINING ANTIOXIDANT
William Bradford Bond, Wilmington, Del., assignor to E. I. du Pont de Nemours and Company, Wilmington, Del., a corporation of Delaware
No Drawing. Filed Oct. 1, 1962, Ser. No. 227,589
5 Claims. (Cl. 260—45.75)

This invention relates to the stabilization of synthetic linear polyamides against degradation at elevated temperatures.

Synthetic linear polyamides are well known for their outstanding properties in many end uses, such as in textile fibers and molded articles of various types. In recent years, melt-spun polyamide yarns have come into widespread use in the reinforcement of pneumatic tires for automobiles and other vehicles. In this, as well as in other end uses such as electrical insulation, the yarn is often subjected to high temperature for extended periods of time. Under these conditions, the polyamide tends to loose strength and become brittle unless a suitable stabilizing agent is added.

U.S. Patent 3,003,995 to Schule discloses and claims the use of diarylamine-ketone condensation products as stabilizers in polycaproamide, which is known commercially as 6-nylon. However, results tabulated in the patent disclosure clearly illustrate that this class of antioxidants is specific to polycaproamide and lacks utility when incorporated in 6-6 nylon (polyhexamethylene adipamide).

In the practice of the present invention, 6-6 nylon and certain other polyamides are stabilized with rubber antioxidants containing as the major ingredient a water-insoluble aryl-substituted secondary diamine provided that a small amount of a soluble copper compound is employed in combination with the organic antioxidant. It has also been found that other organic antioxidants in addition to those exemplified hereinafter can be used to good advantage in combination with a soluble copper compound. Particular examples are N-phenyl-N'-p-toluenesulfonyl-p-phenylenediamine and phenothiazine.

In the example, parts and percents are by weight of the stabilized polymer, unless otherwise specified.

*Example*

To 72.1 pounds of an aqueous solution containing 48.2% of hexamethylenediammonium adipate is added 1.36 grams of cupric acetate dissolved in water. The salt solution is then concentrated at 136° C. and 13 p.s.i. until the salt concentration reaches 75% by weight of the solution which is then pumped into an autoclave where the pressure is increased to 200 p.s.i. and the temperature to 210° C. In separate runs, 10% solutions of two different organic antioxidants in benzene are injected in sufficient quantity to give the antioxidant concentrations shown in the table. The temperature is then increased to 240° C. over a period of one hour. The pressure is then gradually reduced to atmospheric over a period of 90 minutes while the temperature increases to 270° C. After holding at 270° C. for an additional 30 minutes, molten polymer is extruded under 90 pounds nitrogen pressure in the form of a ribbon upon a casting wheel and the ribbon is quenched by cooling with water before being cut into flake. The technique of casting, quenching and cutting to flake is taught in Example I of U.S. Patent 2,289,774.

Each batch of flake is melt-spun to form 210 denier, 34 filament yarn and then drawn over a 190° C. hot plate at a ratio of 5.0. Samples of the drawn yarns are placed in a forced air oven at 180° C. for varying periods of time and the tensile properties of the heat-aged yarns determined. The percent tenacity retained after 24 hours as measured at room temperatures is calculated. Comparative results are shown in the table.

The two organic antioxidants identified in the table as A and B have the following compositions:

Antioxidant A—a rubber antioxidant, "Flexamine," which is a mixture of about 35% by weight of N,N'-diphenyl-p-phenylene diamine and 65% by weight of the reaction product of acetone and diphenylamine, as described more fully by Schule;

Antioxidant B—N,N'-dinaphthyl-p-phenylenediamine.

TABLE

| Antioxidants added: | Tenacity retained, percent |
|---|---|
| 0.01% cupric acetate | 43 |
| 0.5% antioxidant A | 45 |
| 0.5% antioxidant A and 0.01% cupric acetate | 69 |
| 1.0% antioxidant B | <41 |
| 0.5% antioxidant B and 0.01% cupric acetate | 79 |

As is apparent from the tabulated results, the loss in yarn strength is much less when a soluble copper compound is added in combination with the organic antioxidant than is the case when either the organic antioxidant or the copper compound is added alone. Due to this unexpected synergistic effect, the organic antioxidant which alone is ineffective for 6-6 nylon may be used to advantage by adding a small amount of an inexpensive inorganic compound.

At least 0.1% of the organic antioxidant should be used and the concentration is preferably in the range of from 0.1–1.0% by weight of the polyamide. For effective results, the copper compound employed must be capable of being dissolved or uniformly dispersed in the polymer and should be present in amounts ranging from 0.005–0.1% by weight, calculated as copper acetate. Suitable compounds, in addition to copper acetate, include those described in U.S. Patent 2,705,227 as giving "copper in dissolved form."

In addition to their exemplified usages, the antioxidant compositions of this invention may also be used to advantage in polyhexamethylene isophthalamide, polyhexamethylene sebacamide, polyoctamethylene oxamide, poly-2-methyl hexamethylene terephthalamide, poly-m-phenylene adipamide, poly-m-phenylene suberamide, poly-m-xylylene adipamide, polyhexamethylene 5-t-butylisophthalamide, polyhexamethylene-2,5-dimethyl terephthalamide, poly-4,4'-dicyclohexylmethane azelamide, poly-4,4'-dicyclohexylmethane sebacamide and copolymers and melt blends thereof.

Having thus described the invention, what is claimed as new and desired to be secured by Letters Patent is:

1. A polyamide stabilized by the addition of from 0.1–1.0% by weight of an organic antioxidant selected from the group consisting of a mixture of about 35% by weight of N,N'-diphenyl-p-phenylene diamine and 65% by weight of the reaction product of acetone and diphenylamine, N,N'-dinapthyl-p-phenylenediamine, and N-phenyl-N'-p-toluenesulfonyl-p-phenylenediamine, and from 0.005–0.1% by weight of a soluble copper compound, said polyamide being selected from the group consisting of polyhexamethylene adipamide, polyhexamethylene isophthalamide, polyhexamethylene sebacamide, polyoctamethylene oxamide, poly-2-methyl hexamethylene terephthalamide, poly-m-phenylene adipamide, poly-m-phenylene suberamide, poly-m-xylylene adipamide, polyhexamethylene 5-t-butylisophthalamide, polyhexamethylene-2,5-dimethyl terephthalamide, poly-4,4'-dicyclohexylmethane azelamide, poly-4,4'-dicyclohexylmethane sebacamide and copolymers and melt blends thereof.

2. The polyamide of claim 1 wherein said compound is cupric acetate.

3. An article shaped from the stabilized polyamide of claim 2.

4. Polyhexamethylene adipamide stabilized by the addition of about 0.5% by weight of N,N'-dinaphthyl-p-phenylenediamine and about 0.01% by weight of cupric acetate.

5. An article shaped from the stabilized polyamide of claim 4.

References Cited by the Examiner

UNITED STATES PATENTS

| 1,869,657 | 8/1932 | Bowers | 260—809 |
| 2,349,749 | 5/1944 | Paul | 260—809 |
| 2,705,227 | 3/1955 | Stamatoff | 260—45.75 |
| 2,960,489 | 11/1960 | Gabler | 260—45.75 |
| 3,003,995 | 10/1961 | Schyle | 260—45.9 |

FOREIGN PATENTS

| 610,647 | 5/1962 | Belgium. |
| 932,066 | 7/1963 | Great Britain. |

OTHER REFERENCES

Chemical Abs., 44:2269g.

LEON J. BERCOVITZ, *Primary Examiner.*

WILLIAM H. SHORT, *Examiner.*

D. K. WEDDING, G. W. RAUCHFUSS, Jr.,
*Assistant Examiners.*